United States Patent
Gallegos

(10) Patent No.: US 12,428,844 B2
(45) Date of Patent: Sep. 30, 2025

(54) ATTACHMENT BRACKET APPARATUS

(71) Applicant: Unirac Inc., Albuquerque, NM (US)

(72) Inventor: Ernest Gallegos, Albuquerque, NM (US)

(73) Assignee: Unirac, Inc., Albuquerque, NM (US)

( * ) Notice: Subject to any disclaimer, the term of this patent is extended or adjusted under 35 U.S.C. 154(b) by 0 days.

(21) Appl. No.: 18/374,846

(22) Filed: Sep. 29, 2023

(65) Prior Publication Data

US 2024/0018785 A1  Jan. 18, 2024

Related U.S. Application Data

(63) Continuation of application No. 17/327,569, filed on May 21, 2021, now Pat. No. 11,808,042.

(51) Int. Cl.
  *E04D 13/00* (2006.01)
  *F16M 13/02* (2006.01)

(52) U.S. Cl.
  CPC ............. *E04D 13/00* (2013.01); *F16M 13/02* (2013.01)

(58) Field of Classification Search
  CPC ......... F16M 13/00; F16M 13/02; E04D 13/00
  See application file for complete search history.

(56) References Cited

U.S. PATENT DOCUMENTS

| | | |
|---|---|---|
| D31,970 S | 12/1899 | Ukn |
| D157,905 S | 3/1950 | Risk |
| D212,125 S | 8/1968 | Barry |
| D251,684 S | 4/1979 | Wood et al. |
| 5,609,326 A | 3/1997 | Stearns et al. |
| RE35,485 E | 4/1997 | Stewart |
| D408,272 S | 4/1999 | Caron et al. |
| D437,771 S | 2/2001 | Barnes et al. |
| D443,501 S | 6/2001 | Sleppy |
| D449,623 S | 10/2001 | Neuerburg |
| 6,923,611 B2 | 8/2005 | Kenny |
| 7,012,188 B2 | 3/2006 | Erling |
| D536,239 S | 2/2007 | Tallman |
| D559,083 S | 1/2008 | Brassard |
| D640,289 S | 6/2011 | Wilhelm |
| D647,538 S | 10/2011 | Wilhelm |

(Continued)

OTHER PUBLICATIONS

The PCT Search Report and Written Opinion mailed Sep. 9, 2022 for PCT application No. PCT/US22/30217, 8 pages.

(Continued)

*Primary Examiner* — Monica E Millner
(74) *Attorney, Agent, or Firm* — Lee & Hayes, P.C.

(57) ABSTRACT

A bracket includes a base configured to be mounted to a mounting surface and a flange extending from the base and positioned to bisect the base thereby forming a first side and a second side of the base. The base includes a first hole disposed along a central axis of the base and in the first side of the base, a second hole disposed along the central axis of the base and in the second side of the base, and one or more divots formed in a top side of the base and disposed on the first side of the base. Fasteners are inserted through the first hole and the second hole when the bracket is secured to a first mounting structure. Furthermore, fasteners are inserted through the first hole, the second hole, and are drilled through the one or more divots when the bracket is secured to a second mounting structure.

20 Claims, 3 Drawing Sheets

(56) References Cited

U.S. PATENT DOCUMENTS

| | | | |
|---|---|---|---|
| 8,733,718 B2 * | 5/2014 | Corsi | F24S 25/617 |
| | | | 52/27 |
| 8,839,575 B1 * | 9/2014 | Liu | F24S 25/613 |
| | | | 52/173.3 |
| D758,174 S | 6/2016 | Lee et al. | |
| 9,484,853 B2 * | 11/2016 | Stapleton | F24S 25/61 |
| D782,281 S | 3/2017 | Kuo | |
| 10,097,133 B2 | 10/2018 | Aliabadi et al. | |
| 10,135,387 B2 | 11/2018 | Seery et al. | |
| 10,171,026 B2 * | 1/2019 | Meine | H02S 20/23 |
| D840,282 S | 2/2019 | Coste | |
| D841,436 S | 2/2019 | Ito et al. | |
| D841,438 S | 2/2019 | Ito et al. | |
| D866,300 S | 11/2019 | Mercier et al. | |
| 10,601,360 B2 * | 3/2020 | Mayfield | F24S 25/10 |
| 10,663,195 B2 | 5/2020 | Ash et al. | |
| 10,767,684 B1 | 9/2020 | Meine et al. | |
| 10,840,850 B1 | 11/2020 | Atia et al. | |
| D909,853 S | 2/2021 | Jasmin | |
| 11,070,166 B2 | 7/2021 | Gideon | |
| D934,929 S | 11/2021 | Kremerman | |
| D968,256 S | 11/2022 | Wang et al. | |
| 11,486,134 B2 | 11/2022 | Meine | |
| 11,515,831 B2 * | 11/2022 | Affentranger, Jr. | F16J 15/14 |
| D983,016 S | 4/2023 | Jasmin et al. | |
| 11,725,688 B2 * | 8/2023 | Meine | F16B 37/14 |
| | | | 52/698 |
| 11,750,143 B1 | 9/2023 | Jasmin et al. | |
| 11,808,042 B2 * | 11/2023 | Gallegos | F16M 13/02 |
| 11,913,206 B1 * | 2/2024 | Banks | E03C 1/324 |
| 12,018,476 B2 * | 6/2024 | Meine | F24S 10/00 |
| 12,085,112 B2 * | 9/2024 | Meine | F16B 43/001 |
| 2006/0096192 A1 | 5/2006 | Daudet | |
| 2014/0109496 A1 | 4/2014 | Stapleton | |
| 2015/0060619 A1 | 3/2015 | Krannich et al. | |
| 2016/0111999 A1 | 4/2016 | Stapleton | |
| 2016/0134230 A1 | 5/2016 | Meine et al. | |
| 2016/0268958 A1 | 9/2016 | Wildes et al. | |
| 2018/0062571 A1 | 3/2018 | Ash et al. | |
| 2018/0102731 A1 * | 4/2018 | Stapleton | F24S 25/636 |
| 2018/0167023 A1 | 6/2018 | Meine | |
| 2019/0081587 A1 | 3/2019 | Mayfield et al. | |
| 2019/0131916 A1 | 5/2019 | Tomolillo | |
| 2019/0131918 A1 | 5/2019 | Kobayashi | |
| 2019/0363668 A1 * | 11/2019 | Stapleton | E04B 1/388 |
| 2020/0244214 A1 * | 7/2020 | Stapleton | F24S 25/636 |
| 2022/0372762 A1 | 11/2022 | Gallegos | |
| 2023/0087857 A1 | 3/2023 | Anselmo | |
| 2023/0090124 A1 | 3/2023 | Haddock et al. | |
| 2023/0258295 A1 | 8/2023 | Gallegos | |
| 2024/0060598 A1 | 2/2024 | Wogan et al. | |

OTHER PUBLICATIONS

Search Report and Written Opinion for International Application No. PCT/US24/15689, Dated May 29, 2024, 12 pages.

"Uxcell Aluminum L Shape Solar Panel Mounting Brackets", Retrieved Jul. 16, 2024, at <<, https://www.amazon.com/uxcell-80x40x40mm-Aluminum-Mounting-Brackets/dp/B078HVFGTM>>, 2017, 3 pgs.

Monotaro.SG. "Monlaro_NPL" 8 . . . [online]. Apr. 18, 2012; [Retrieved on Jul. 20, 2022]. Retrieved from the internet: <url:—A https://www.monotaro.sg/g/1000185903.html?experiment_1804=1 > p. 1, first picture, last 6-8 sentence of the first paragraph under the picture.

Office Action for U.S. Appl. No. 17/327,569, mailed on Mar. 30, 2023, Gallegos, "Attachment Bracket Apparatus", 24 Pages.

Office Action for U.S. Appl. No. 17/327,569, mailed on Aug. 10, 2022, Gallegos, "Attachment Bracket Apparatus", 19 Pages.

Office Action for U.S. Appl. No. 18/109,734, mailed on Nov. 19, 2024, Gallegos, "Attachment Bracket Apparatus", 8 Pages.

Search Report for European Patent Application No. 22805555.4, Dated Feb. 25, 2025, 8 pages.

* cited by examiner

ATTACHMENT BRACKET APPARATUS

CROSS-REFERENCE TO RELATED APPLICATIONS

This application is a continuation of U.S application Ser. No. 17/327,569, filed May 21, 2021, the entire disclosure of which is incorporated herein by reference.

BACKGROUND

As the solar energy industry continues to grow, the equipment to mount photovoltaic (PV) modules (AKA "solar panels") on different types of structures and/or locations continues to adapt and improve as well. Though a variety of apparatuses exist to secure the PV modules and/or anchor PV module mounting assemblies, the number of parts and or different arrangements of the parts still leave much to be desired for an efficient and quick assembly to minimize the amount of time a worker may be working on a roof or in a similarly physically demanding or potentially hazardous condition.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

This disclosure is directed to an attachment bracket apparatus, which is referred to herein as "the bracket." Embodiments of the bracket disclosed herein may be used on a roof or other structure and is a simple, secure, and watertight solution that provides a structure to which solar panel mounting equipment may be attached.

The bracket disclosed herein may include through holes in the bracket through which fasteners are inserted to secure the bracket to a first type of structure such as a rafter or other type of beam. The bracket disclosed herein may also include divots, depressions, or dents (referred to herein as "the divots") in a base of the bracket through which fasteners may be optionally drilled to secure to the bracket to a second type of structure such as roof decking or other type of sheathing. The divots provide a guide where fasteners may be easily drilled through the base of the bracket when securing the bracket to the second type of structure. For example, a thickness of the base of the bracket may be thinner at a location of the divots compared to other portions of the base, allowing an installer to easily drill through the base when securing the bracket to a structure. Furthermore, when fasteners are not drilled through the depressions when the bracket is secured to the first type of structure, the divots prevent water, air, particulate matter, or other undesirable substances from getting below the base of the bracket which could cause damage to the bracket, roof, or other structure to which the bracket is mounted.

The bracket disclosed herein may include an integrated sealing system. Embodiments of the bracket disclosed herein may eliminate the use of standard flashing necessitated by known products. Once the bracket is fastened to a roof (or other structure), a sealant may be injected through a port into an enclosed cavity around the fastener(s) and corresponding roof penetration(s). The force from the sealant dispenser gun increases the pressure inside enclosed cavity forcing air out through a vent opposite the port. This method may allow for sealant to completely fill voids and remove air inside the enclosed cavity around the penetration(s).

Advantages of the embodiments of the bracket disclosed herein include but are not limited to: a bracket that is easily securable to various types of structures; creation of a permanent airtight and watertight seal; elimination of standard flashings and assemblies, thereby reducing costs; elimination of the need to cut shingles; and reduction of the overall cost and time to install a system.

Illustrative Embodiments of an Attachment Bracket

Figure 1:
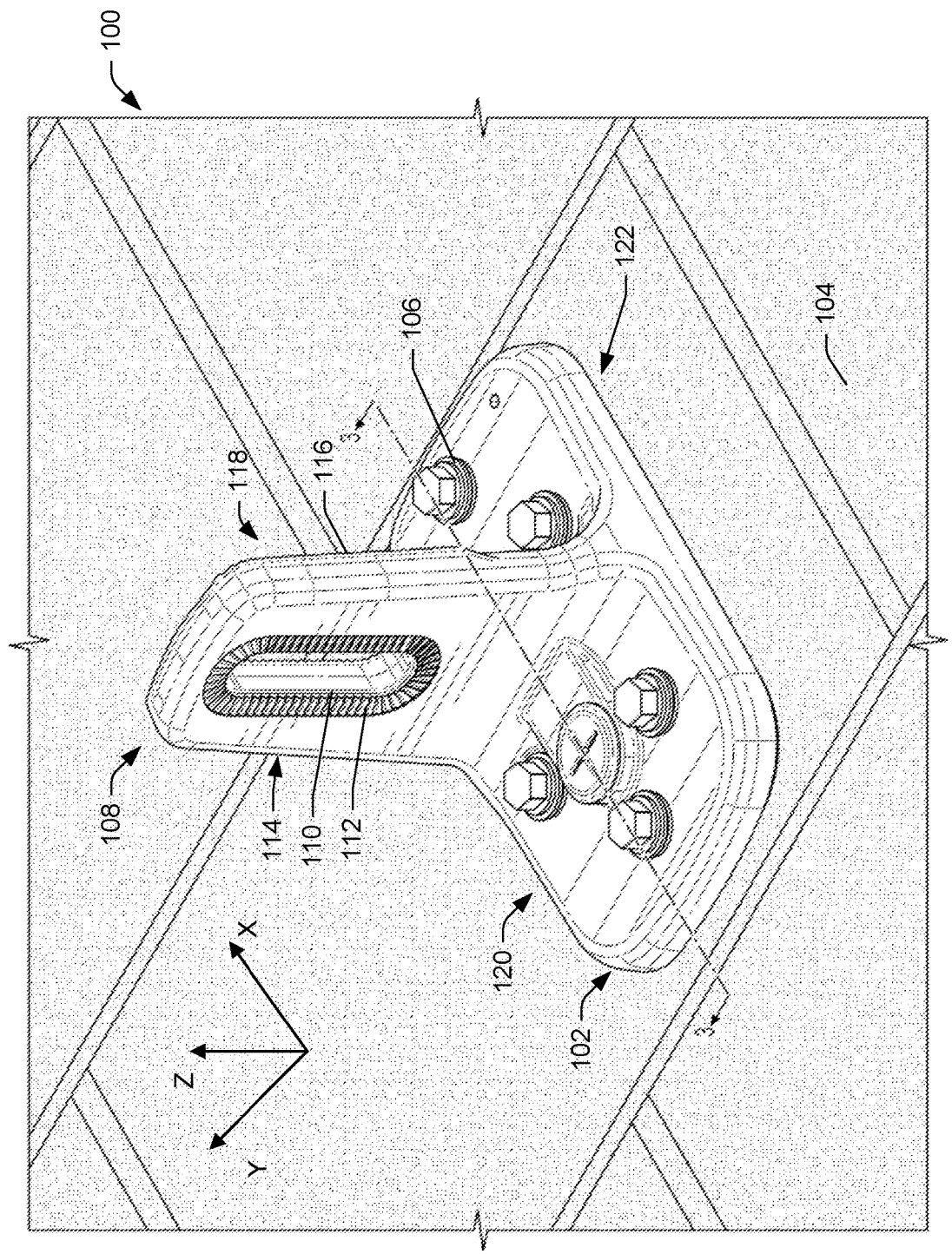
FIG. 1 illustrates a perspective view of an attachment bracket apparatus mounted to a mounting structure, according to an embodiment of this disclosure.

Specifically, FIG. 1 illustrates an attachment bracket apparatus 100 ("bracket"). In an embodiment, the bracket 100 may be configured to support a solar panel mount rail by securing the solar panel mount rail thereto. The bracket 100 includes a base 102 that extends in a first plane (such as a horizontal plane or in the X direction). The base 102 of the bracket 100 is configured to be secured to a mounting structure 104. In an embodiment, the mounting structure 104 may comprise a roof or other structure to which the bracket 100 is coupled or otherwise secured. In an embodiment, various intervening components may be disposed between the bracket 100 and the mounting structure 104. For example, tar paper, shingles, housewrap, roof decking, sheathing, or other components of a roof or other structure may be disposed between the base 102 of the bracket 100 and the mounting structure 104. Despite the various intervening components, the bracket 100 may be secured to the mounting structure via fasteners 106 that are inserted through the base 102 and into the mounting structure, thereby securing the bracket 100 to the mounting structure 104.

The mounting structure 104 may include different types of mounting structures depending on application and/or mounting location. For example, the mounting structure 104 may include a first type of mounting structure such as a rafter, strut, or other type of beam to which the bracket 100 is secured. Furthermore, the mounting structure 104 may include a second type of mounting structure such as roof decking or other type of sheathing to which the bracket 100 is secured. While describing two types of mounting structures, it is to be understood that the bracket 100 may be secured to less than or more than two types of mounting structures. The varying types of mounting structures may include various compositions and mechanical properties. As such, the bracket 100 may be secured to the mounting structure 104 via various configurations of fasteners and components of the bracket 100, as will be described further herein below.

The bracket 100 also includes a flange 108 extending vertically from the base 102 of the bracket 100 in a direction transverse to a direction of extension of the plane of the base 102. In an embodiment, the flange 108 extends in a second plane (such as a vertical plane or in the Z direction) that is substantially perpendicular to the first plane. In an embodiment the flange 108 extends from a top side of the base 102 and is positioned transverse to a length of the base 102, such that the flange 108 bisects the base 102.

The flange 108 includes an aperture 110 extending at least a portion of a length of the flange 108. In an embodiment, one or more fasteners may be inserted through the aperture 110 of the flange 108 in order to secure a secondary structure (such as a solar panel mounting rail) to the flange 108 of the bracket 100. In an embodiment, the flange 108 may include teeth 112 extending from the aperture 110. The teeth 112 may include rachet teeth and may extend radially from the aperture 110. The teeth 112 may be disposed on a first side 114 of the flange 108 and may be configured to correspond with rachet teeth on one or more fasteners that are inserted into the aperture 110 in order to secure the secondary structure thereto. The flange 108 may also include corrugations 116 extending from a second side 118 of the flange 108 that is opposite the first side 114. The corrugations 116 may be configured to extend parallel to each other. As mentioned previously, the flange 108 may be positioned to bisect the base 102, thereby forming a first side 120 and a second side 122 of the base 102.

Figure 2:
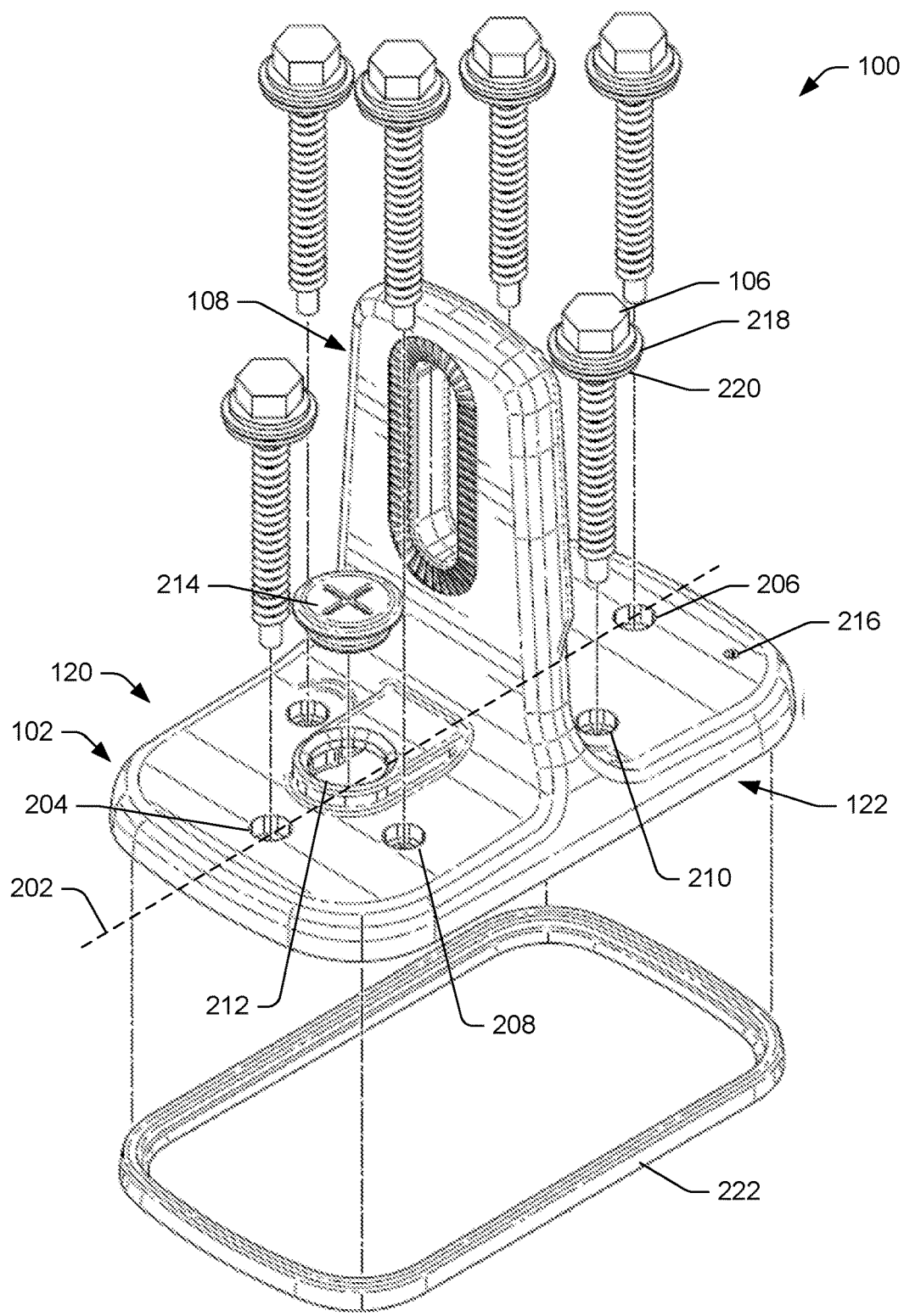
FIG. 2 illustrates an exploded view of various components of the attachment bracket apparatus shown in FIG. 1, according to an embodiment of this disclosure.

FIG. 2 illustrates an exploded view of various components of the bracket 100, as shown and described in FIG. 1. In an embodiment, the base 102 may include a central axis 202 extending along a length of the base 102. In an embodiment, the base 102 includes a first hole 204 disposed along the central axis 202 of the base 102 and in the first side 120 of the base 102. The first hole 202 may be configured to secure a fastener 106 therein. The base 102 may also include a second hole 206 disposed along the central axis 202 of the base 102 and the second side of the base 102. The second hole 206 may be configured to secure a faster therein. In an embodiment, when the bracket 100 is secured to the first type of mounting structure, the bracket 100 may be secured to the mounting structure 104 via fasteners that are inserted through the first hole 204 and the second hole 206. Since rafters and other types of beams are more robust than sheathing or other types of mounting structures, the bracket 100 may be mounted to the first type of mounting structure using fewer fasteners and corresponding holes in the bracket 100 than when the bracket 100 is secured to sheathing. As such, when the bracket 100 is secured to the first type of mounting structure, the bracket 100 may be secured to the mounting structure 104 via fasteners inserted through the first hole 204 and the second hole 206.

In an embodiment, the base 102 further includes one or more first divots 208 disposed on the first side 120 of the base 102 adjacent the central axis 202. The one or more first divots 208 may include semi-circular divots formed in the base 102 and configured to provide a guide for self-drilling fasteners as the self-drilling fasteners are drilled through the one or more first divots 208. Additionally, and/or alternatively, the base 102 may also include one or more second divots 210 disposed on the second side 122 of the base 102 adjacent the central axis 202. The one or more second divots 210 also include semi-circular divots formed in the base 102 and configured to provide a guide for self-drilling fasteners as the self-drilling fasteners are drilled through the one or more first divots 208. In an embodiment, the fasteners are optionally drilled through the one or more first divots 208 and/or the one or more second divots 210 when the bracket 100 is secured to the second type of mounting structure. For example, and as described previously, the second type of mounting structure may include roof decking or other type of sheathing that is less robust than a rafter or other beam. As such, the one or more first divots 208 and the one or more second divots 210 provide a guide where fasteners may be easily drilled through the base 102 of the bracket 100 when securing the bracket to the second type of mounting structure. Furthermore, if some of the one or more first divots 208 and/or the one or more second divots 210 are not drilled when the bracket 100 is secured to the first type of mounting structure or the second type of mounting structure, the one or more first divots 208 and/or the one or more second divots 210 prevent water, air, or other substances from entering into a space between the bracket and the mounting surface 104.

In an embodiment, the bracket 100 further includes an injection port 212 disposed within the first side of the base 102 and in connection with a cavity (shown in FIG. 3) formed by a bottom surface of the base. The injection port 212 may include a plug 214 inserted at least partially within the injection port 212. In an embodiment, the plug 214 is penetrable by a sealant dispenser such that the injection port 212 receives sealant via injection, thereby permitting passage of the sealant into an empty space formed between the cavity of the base and the mounting structure. The plug 214 may comprise a rubber plug having slits formed therein to allow a tip of a sealant dispensing gun to pass therethrough. In an embodiment, the bracket 100 further includes a vent port 216 disposed within the second side 210 of the base 102 and in connection with the cavity. The vent port 216 is configured to allow sealant to displace air within the empty space when sealant is injected into the empty space.

As shown in FIG. 2, the bracket 100 includes fasteners 106 that may include one or more washers disposed between a head of the fasteners 106 and the base 102 of the bracket 100. For example, the fasteners 106 may include a metallic washer 218 disposed proximate the head of the fastener and a rubber washer 220 disposed proximate the base 102 of the bracket 100 and between the base 102 and the metallic washer 218. In an embodiment, the rubber washer 220 seals a hole formed by a fastener by at least partially covering a hole in which the fastener is inserted and by engaging threading along a shaft of the fastener.

The bracket 100 further includes a gasket 222 (or seal) that is configured to be inserted into a groove (shown and described with respect to FIG. 3) in the bracket 100. The gasket 222 may provide an airtight and watertight seal for the base 102 when the base 102 is mounted to the mounting structure 104. The gasket 222 may comprise rubber, fiber, foam, rubber molding compounds, or any other suitable material that provides a secure seal between the base 102 of the bracket 100 and the mounting structure 104.

Figure 3:
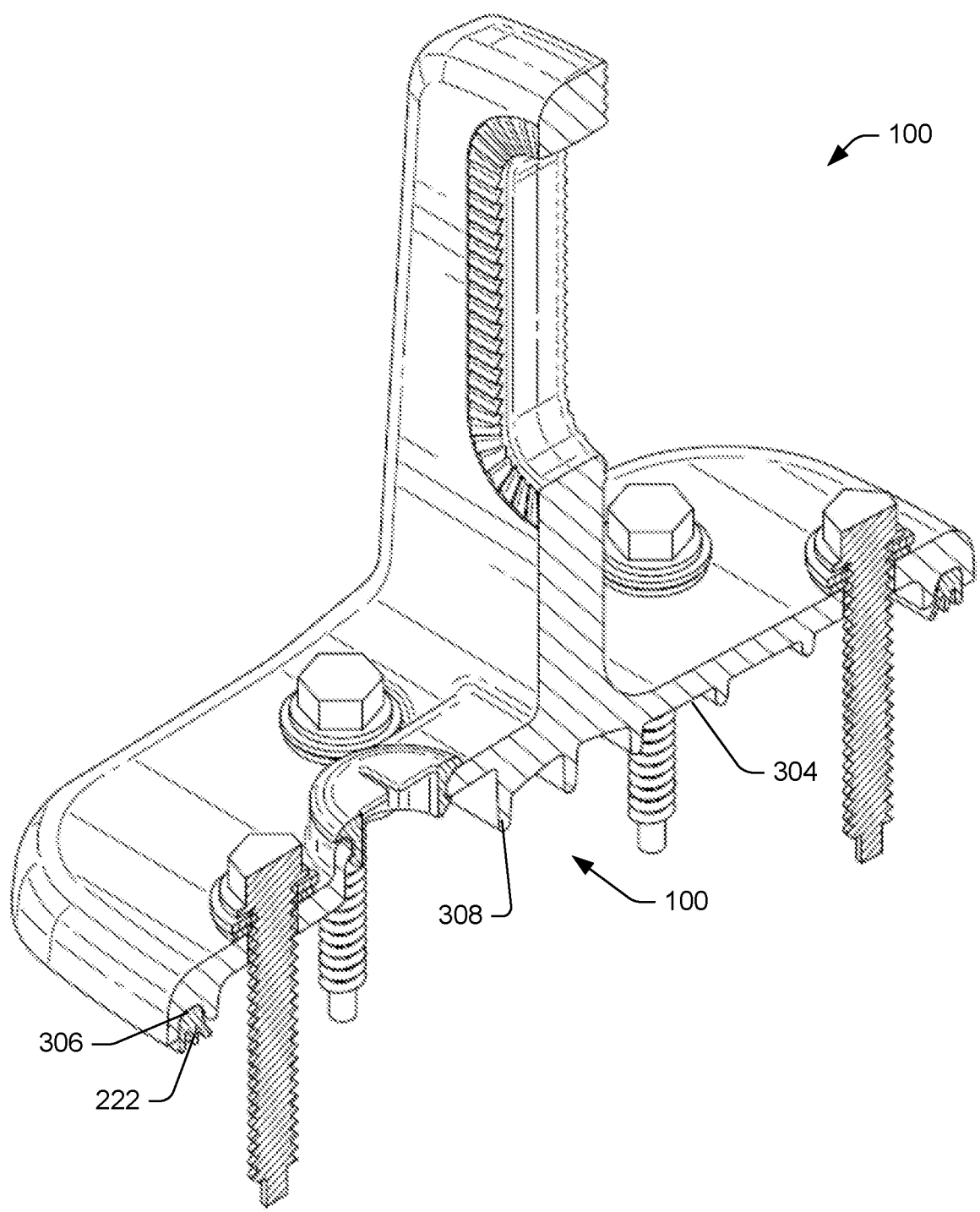
FIG. 3 illustrates a cross-sectional view of the attachment bracket apparatus shown in FIG. 1, according to an embodiment of this disclosure.

FIG. 3 illustrates a cross-sectional view of the bracket 100. As described previously, the bracket 100 includes a cavity 302 formed at least partially by a bottom surface 304 (or bottom side) of the bracket 100. The cavity 302 is configured to enclose an empty space between the cavity and the mounting surface 104. In an embodiment, when sealant is injected into the cavity, the sealant may completely fill the cavity 302. The bracket 100 further includes a groove 306 that circumscribes a bottom portion (or bottom side) of the base 102. As mentioned previously, the bracket 100 includes the gasket 222 that is inserted into the groove 306 such that the gasket 222 fills the groove 306 and at least a portion of the gasket 222 extends from the groove 306.

The base 102 may further include one or more ribs 308 extending from the bottom surface 304 of the base 102. The one or more ribs 308 may strengthen the base 102, while allowing for a reduced amount of material to form the cavity 302 in the base 102.

Conclusion

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A bracket comprising:
a base having a central axis extending along a length direction of the base;
a flange extending upward from a top surface of the base and oriented to delineate the base into a first side and a second side;
a first fastener position disposed along the central axis of the base and on the first side of the base;
a second fastener position disposed along the central axis of the base and on the second side of the base;
two or more first additional fastener guides disposed on the first side of the base, the two or more first additional fastener guides being offset from the central axis, and the two or more first additional fastener guides being furthermore offset in differing amounts in the length direction from the first fastener position;
two or more second additional fastener guides disposed on the second side of the base, the two or more second additional fastener guides being offset from the central axis, and the two or more second additional fastener guides being furthermore offset in differing amounts in the length direction from the second fastener position; and
a cavity formed in a bottom portion of the base, a perimeter of the cavity being shaped to house a multi-element sealing system to seal the base against a mounting surface.

2. The bracket of claim 1, wherein:
the first side and the second side are substantially equal,
the two or more first additional fastener quides are asymmetrical about the central axis, and
the two or more second additional fastener guides are asymmetrical about the central axis.

3. The bracket of claim 1, wherein the base includes a sealant port accessing the cavity.

4. The bracket of claim 1, wherein the base includes a vent port in connection with the cavity, the vent port being configured to allow sealant to displace air within the cavity.

5. A bracket comprising:
a base having a length direction;
a flange extending upward from a top surface of the base and oriented transverse to the length direction, thereby delineating a first side and a second side of the base;
a first fastener position disposed on the first side of the base;
a second fastener position disposed on the second side of the base;
two or more first additional fastener guides disposed on the first side of the base, the two or more first additional fastener guides being offset from an axis extending between the first fastener position and the second fastener position, and the two or more first additional fastener guides being furthermore offset in differing amounts in the length direction from the first fastener position;
two or more second additional fastener guides disposed on the second side of the base, the two or more second additional fastener guides being offset from the axis extending between the first fastener position and the second fastener position, and the two or more second additional fastener guides being furthermore offset in differing amounts in the length direction from the second fastener position; and
a cavity formed in a bottom portion of the base, a perimeter of the base being shaped to form the cavity and to house a sealing system to seal the base against a mounting surface, the sealing system including a first sealing material and a second sealing material,
wherein the second sealing material is different than the first sealing material.

6. The bracket of claim 5, wherein:
the base has a central axis extending along the length direction,
the first fastener position and the second fastener position are disposed substantially along the central axis,
the two or more first additional fastener quides are asymmetrical about the central axis,
the two or more first additional fastener guides are all disposed closer to the flange than the first fastener position,
the two or more second additional fastener quides are asymmetrical about the central axis, and
the two or more second additional fastener quides are all disposed closer to the flange than the second fastener position.

7. The bracket of claim 5, wherein the first side and the second side are substantially equal.

8. The bracket of claim 5, wherein the two or more first additional fastener guides and the two or more second additional fastener guides include divots.

9. The bracket of claim 5, wherein the base includes a groove that circumscribes the bottom portion of the base.

10. The bracket of claim 9, wherein the groove is defined by parallel groove sidewalls configured to receive a gasket configured to be inserted within the groove such that the gasket fills the groove and at least a portion of the gasket extends from the groove.

11. A bracket comprising:
a base having a length direction;
a flange extending upward from a top surface of the base, the flange delineating a first side and a second side of the base;
a first fastener position disposed on the first side of the base;
a second fastener position disposed on the second side of the base;
one or more first additional fastener guides disposed on the first side of the base, the one or more first additional fastener guides being offset from an axis extending between the first fastener position and the second fastener position, and the one or more first additional fastener guides being furthermore offset in the length direction from the first fastener position;
one or more second additional fastener guides disposed on the second side of the base, the one or more second additional fastener guides being offset from the axis extending between the first fastener position and the second fastener position, and the one or more second additional fastener guides being furthermore offset in the length direction from the second fastener position; and
a cavity formed in a bottom portion of the base that is under the top surface of the base, the base includes a perimeter shaped to form the cavity and to house a sealing system to seal the base against a mounting surface, and the sealing system including a first sealing material and a second sealing material,
wherein the second sealing material is different than the first sealing material.

12. The bracket of claim 11, wherein the base has a central axis extending along the length direction, and wherein the first fastener position and the second fastener position are disposed substantially along the central axis.

13. The bracket of claim 11, wherein the first side and the second side are substantially equal.

14. The bracket of claim 11, wherein the one or more first additional fastener guides include at least two first additional fastener guides, and wherein the at least two first additional fastener guides are offset in differing amounts in the length direction from the first fastener position so that the at least two first additional fastener guides are asymmetrical about a central axis of the base.

15. The bracket of claim 11, wherein the flange includes an aperture therein.

16. The bracket of claim 15, wherein the bracket further comprises one or more fasteners sized for insertion through the aperture to secure a solar panel mounting rail to the flange.

17. The bracket of claim 15, wherein the flange further includes rachet teeth extending radially from a first side of the aperture.

18. The bracket of claim 17, wherein the flange further includes corrugations extending from a second side of the aperture.

19. The bracket of claim 18, wherein the corrugations extend parallel to each other.

20. The bracket of claim 11, wherein the base includes a sealant port in access with the cavity.

* * * * *